(12) United States Patent
Gan et al.

(10) Patent No.: US 7,939,199 B1
(45) Date of Patent: May 10, 2011

(54) METHOD OF CONTROLLING VOLTAGE DELAY AND RDC GROWTH IN AN ELECTROCHEMICAL CELL USING LOW BASIS WEIGHT CATHODE MATERIAL

(75) Inventors: Hong Gan, Williamsville, NY (US); Joseph M. Lehnes, Williamsville, NY (US); Esther S. Takeuchi, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 970 days.

(21) Appl. No.: 11/736,039

(22) Filed: Apr. 17, 2007

Related U.S. Application Data

(60) Provisional application No. 60/829,741, filed on Oct. 17, 2006.

(51) Int. Cl.
*H01M 10/32* (2006.01)
(52) U.S. Cl. ........ 429/219; 429/209; 429/220; 429/223; 429/224; 429/231.5; 429/231.7
(58) Field of Classification Search .................. 429/203, 429/219, 220, 221, 223, 224, 231.1, 231, 429/231.7, 241, 245, 209, 231.5
See application file for complete search history.

(56) References Cited

U.S. PATENT DOCUMENTS

| | | | |
|---|---|---|---|
| 4,830,940 A | 5/1989 | Keister et al. | |
| 4,964,877 A | 10/1990 | Keister et al. | |
| 5,435,874 A | 7/1995 | Takeuchi et al. | |
| 5,472,810 A | 12/1995 | Takeuchi et al. | |
| 5,516,340 A | 5/1996 | Takeuchi et al. | |
| 5,571,640 A | 11/1996 | Takeuchi et al. | |
| 6,174,622 B1 | 1/2001 | Thiebolt, III et al. | |
| 6,551,747 B1 | 4/2003 | Gan | |
| 6,566,007 B1 | 5/2003 | Takeuchi et al. | |
| 6,582,545 B1 | 6/2003 | Thiebolt, III et al. | |
| 6,627,353 B1 | 9/2003 | Munshi | |
| 6,641,953 B2 | 11/2003 | Takeuchi et al. | |
| 6,930,468 B2 | 8/2005 | Syracuse et al. | |
| 6,982,543 B2 | 1/2006 | Syracuse et al. | |
| 7,026,791 B2 | 4/2006 | Palazzo et al. | |
| 2002/0132167 A1 * | 9/2002 | Gan et al. | 429/241 |
| 2003/0129484 A1 * | 7/2003 | Gan et al. | 429/128 |
| 2003/0134204 A1 * | 7/2003 | Gan et al. | 429/332 |
| 2004/0091773 A1 | 5/2004 | Boczer et al. | |
| 2005/0064290 A1 * | 3/2005 | Panzer et al. | 429/218.1 |
| 2006/0035147 A1 * | 2/2006 | Lam et al. | 429/218.1 |
| 2010/0196765 A1 * | 8/2010 | Palazzo et al. | 429/338 |

* cited by examiner

*Primary Examiner* — Patrick Ryan
*Assistant Examiner* — Ben Lewis
(74) *Attorney, Agent, or Firm* — Michael F. Scalise (57) ABSTRACT

An electrochemical cell comprising a lithium anode, a silver vanadium oxide cathode having a relatively lower basis weight, and an electrolyte activating the anode and the cathode is described. By limiting the amount of cathode active material per unit area (i.e. basis weight) facing the anode in the Li/SVO cell, the magnitude of the passivating film growth at the solid-electrolyte interphase (SEI) and its relative impermeability to lithium ion diffusion is reduced. Therefore, by using a cathode of a relatively low basis weight active material, it is possible to eliminate or significantly reduce undesirable irreversible Rdc growth and voltage delay in the cell and to extend its useful life in an implantable medical device.

16 Claims, 7 Drawing Sheets

METHOD OF CONTROLLING VOLTAGE DELAY AND RDC GROWTH IN AN ELECTROCHEMICAL CELL USING LOW BASIS WEIGHT CATHODE MATERIAL

CROSS-REFERENCE TO RELATED APPLICATION

This application claims priority from provisional application Ser. No. 60/829,741, filed Oct. 17, 2006.

BACKGROUND OF THE INVENTION

1. Field of the Invention

The present invention generally relates to the conversion of chemical energy to electrical energy. More particularly, this invention relates to an alkali metal/solid cathode electrochemical cell having reduced voltage delay and irreversible Rdc growth. A preferred couple is a lithium/silver vanadium oxide (Li/SVO) cell. In such cells, voltage delay and permanent or irreversible Rdc growth typically occur from about 25% to about 70% depth-of-discharges (DoD). According to the present inventions, these phenomena are limited by the use of relatively low basis weight cathode active materials.

2. Description of Related Art

Voltage delay is a phenomenon typically exhibited in an alkali metal/solid cathode cell, such as of the lithium/silver vanadium oxide couple (Li/SVO) that has been depleted of about 25% to 70% of its capacity and that is subjected to high current pulse discharge applications. It is theorized that in a Li/SVO cell, vanadium compounds become soluble in the cell electrolyte from the cathode and are subsequently deposited onto the lithium anode surface. The resulting anode surface passivation film is electrically insulating, which leads to cell polarization.

Figure 1:
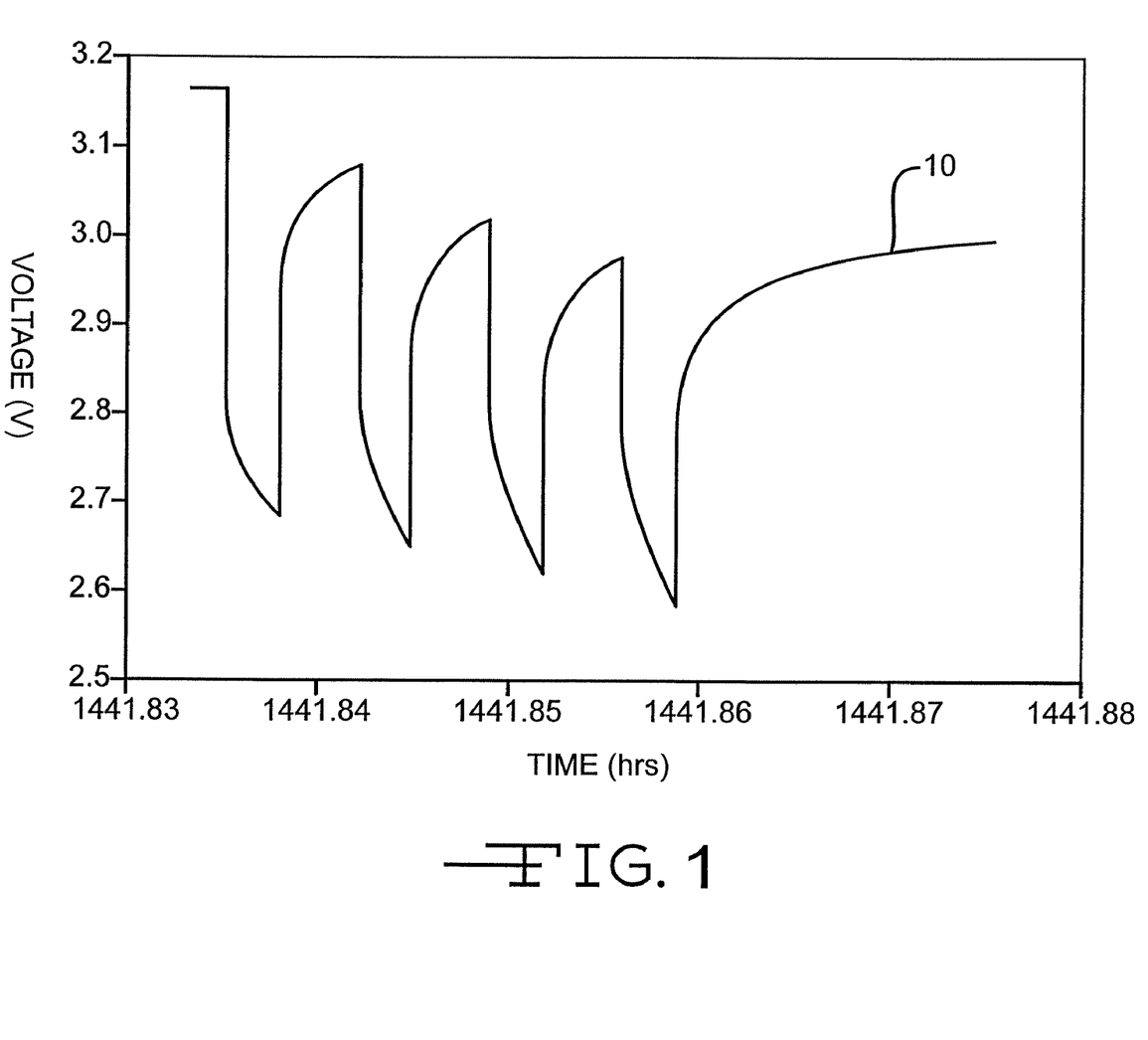
FIG. 1 is a graph showing an illustrative pulse discharge waveform or curve 10 of an exemplary electrochemical cell that does not exhibit voltage delay.

The voltage response of a cell that does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pulses is higher than the minimum potential of the last pulse. FIG. 1 is a graph showing an illustrative discharge curve 10 as a typical or "ideal" waveform of a cell during the application of a series of pulses as a pulse train that does not exhibit voltage delay.

Figure 2:
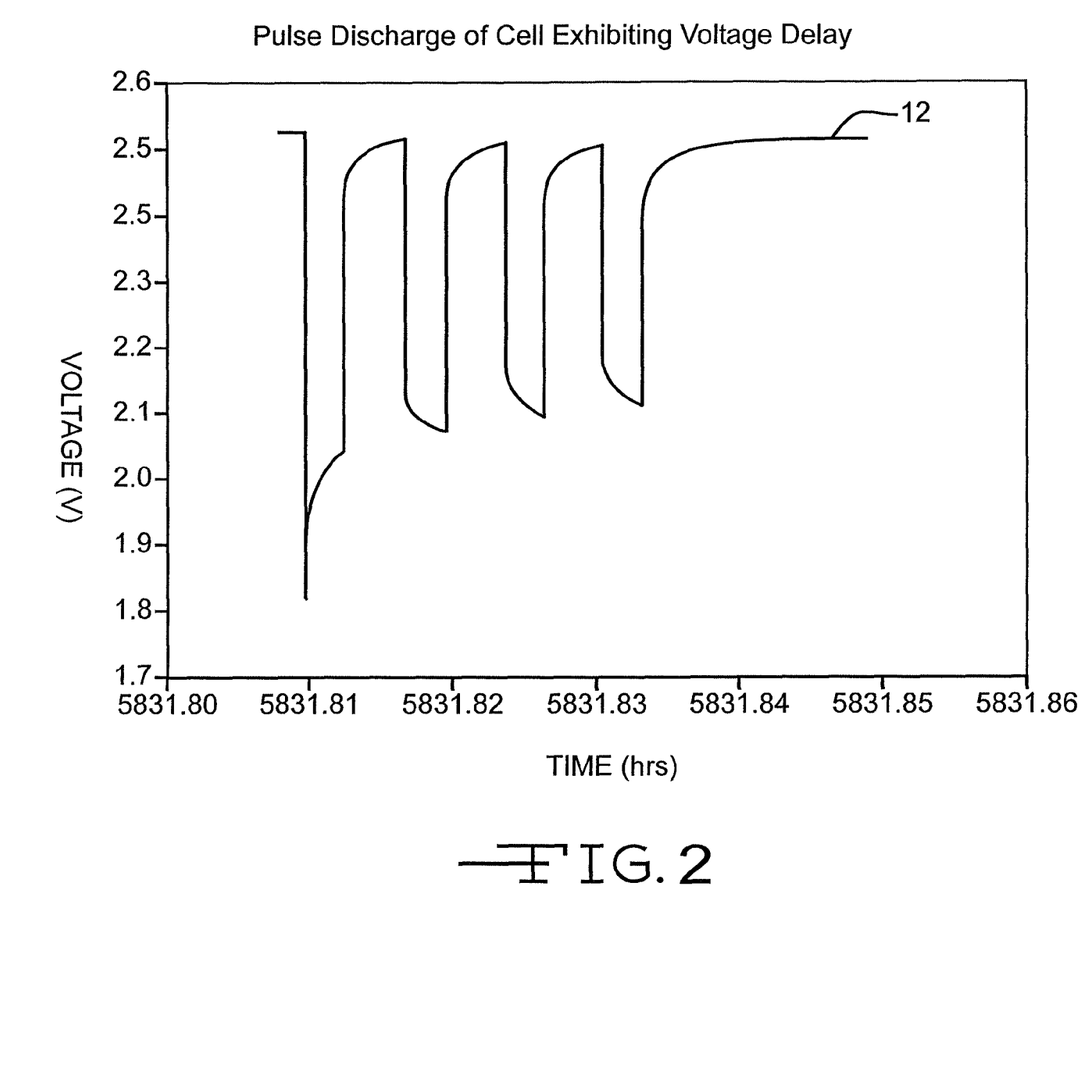
FIG. 2 is a graph showing an illustrative pulse discharge waveform or curve 12 of an exemplary electrochemical cell that exhibits voltage delay.

On the other hand, the voltage response of a cell that exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied. FIG. 2 is a graph showing an illustrative discharge curve 12 as the voltage waveform of a cell that exhibits both forms of voltage delay.

Decreased discharge voltages and the existence of voltage delay are undesirable characteristics of a pulse dischargeable lithium/solid cathode cell, such as a Li/SVO cell, in terms of their influence on devices such as implantable medical devices including pacemakers and automatic implantable cardiac defibrillators. Depressed discharge voltages and voltage delay are undesirable because they limit the effectiveness and even the proper functioning of both the cell and the associated electrically powered device under current pulse discharge conditions.

Heretofore, a number of patents have disclosed Li/SVO cells and various reforming methods and algorithms to minimize irreversible Rdc growth and voltage delay. For example, U.S. Pat. No. 6,982,543 to Syracuse et al., which is assigned to the assignee of the present invention and incorporated herein by reference, describes methodologies for accurately determining the precise boundaries of irreversible Rdc growth and voltage delay in the about 25% to about 70% DoD region of a Li/SVO cell. This is so that more frequent pulse discharging for the purpose of cell reform is confined to the limits of the region.

Additionally, U.S. Pat. No. 6,930,468 to Syracuse et al., which is assigned to the assignee of the present invention and incorporated herein by reference, describes methodologies for minimizing the occurrence of irreversible Rdc growth and voltage delay in the about 25% to about 70% DoD region by subjecting Li/SVO cells to novel discharge regimes. An optimum discharge regime for a particular cell configuration and electrode material set is determined by subjecting groups of exemplary cells of a particular configuration and material set to a range of different discharge regimes to determine their affects on cell performance.

Additionally, U.S. Pat. No. 7,026,791 to Palazzo et al., which is assigned to the assignee of the present invention and incorporated herein by reference, describes conditioning methodologies for minimizing the occurrence of irreversible Rdc growth and voltage delay in the about 35% to about 70% DoD region by subjecting Li/SVO cells to alternative novel discharge regimes consisting of relatively short high current pulses separated by a relatively short rest period between pulses.

With these methodologies, energy consumption for cell reforming may be a significant portion of the overall discharge capacity. For example, in the embodiments disclosed in the '791 patent of Palazzo et al., up to about 10% DoD may be consumed in cell reforming.

Therefore, there remains a need for a lithium/silver vanadium oxide cell that is dischargeable to deliver the high capacity needed for powering implantable medical devices and the like, but that experiences little, if any, irreversible Rdc growth and voltage delay during pulse discharging, especially at about 25% to about 70% DoD. It is preferable that such a cell does not require the use of a complex discharge regime for cell reforming, nor the process control capability to detect the onset of Rdc growth and then initiate such a discharge regime. In other words, there is a need for a cell with minimal irreversible Rdc growth and voltage delay that is attained solely by the choice of electrode active materials and structures, rather than by the use of complex and power consuming discharge regimes.

SUMMARY OF THE INVENTION

It is therefore an object of this invention to provide an electrochemical cell comprising a cathode of a relatively low basis weight active material that results in minimal irreversible Rdc growth and voltage delay.

According to the present invention, there is provided an electrochemical cell comprising a lithium anode, a cathode comprising a cathode active material having a relatively low basis weight, and an electrolyte activating the anode and the cathode. The cathode active material may be selected from the group consisting of silver vanadium oxide, copper silver vanadium oxide, manganese dioxide, copper vanadium oxide, titanium disulfide, copper oxide, copper sulfide, iron sulfide, iron disulfide, fluorinated carbon, and mixtures thereof. In one preferred embodiment, the cathode active material is comprised of silver vanadium oxide having a basis weight of less than about 340 mg/in$^2$.

Also according to the present invention, there is further provided a method of controlling irreversible Rdc growth and voltage delay in an electrochemical cell comprising a lithium anode coupled to a cathode of a cathode active material activated with an electrolyte, the method comprising the steps of: providing the anode, providing the cathode comprised of cathode active material having a relatively low basis weight, positioning the anode and the cathode in a casing, and activating them with an electrolyte.

The foregoing and additional objects, advantages, and characterizing features of the present invention will become increasingly more apparent upon a reading of the following detailed description together with the included drawings.

DETAILED DESCRIPTION OF THE PREFERRED EMBODIMENTS

In describing the present invention, the following terms are used.

The term percent of depth-of-discharge (DOD) is defined as the ratio of delivered capacity to theoretical capacity times 100.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses.

In performing accelerated discharge testing of a cell, an exemplary pulse train may consist of one to four 5- to 20-second pulses (23.2 mA/cm$^2$) with about a 10 to 30 second rest, preferably about 15 second rest, between each pulse. A typically used range of current densities for cells powering implantable medical devices is from about 15 mA/cm$^2$ to about 50 mA/cm$^2$, and more preferably from about 18 mA/cm$^2$ to about 35 mA/cm$^2$. Typically, a 10-second pulse is suitable for medical implantable applications. However, it could be significantly shorter or longer depending on the specific cell design and chemistry and the associated device energy requirements. Current densities are based on square centimeters of the cathode electrode.

An electrochemical cell that possesses sufficient energy density and discharge capacity required to meet the vigorous requirements of implantable medical devices comprises an anode of lithium. An alternate anode comprises a lithium alloy such as a lithium-aluminum alloy. The greater the amounts of aluminum present by weight in the alloy, however, the lower the energy density of the cell.

The form of the anode may vary, but preferably it is a thin metal sheet or foil of lithium metal, pressed or rolled on a metallic anode current collector, i.e., preferably comprising titanium, titanium alloy or nickel. Copper, tungsten and tantalum are also suitable materials for the anode current collector. The anode current collector has an extended tab or lead contacted by a weld to a cell case of conductive metal in a case-negative electrical configuration. Alternatively, the anode may be formed in some other geometry, such as a bobbin shape, cylinder or pellet, to allow for a low surface cell design.

The electrochemical cell of the present invention further comprises a cathode of electrically conductive material that serves as the counter electrode. The cathode is preferably of solid materials having the general formula $SM_xV_2O_y$ where SM is a metal selected from Groups IB to VIIB and VIIIB of the Periodic Table of Elements, and wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and s-phase silver vanadium oxide having in the general formula x=1.0 and y=5.5, and combination and mixtures of phases thereof.

Another preferred composite transition metal oxide cathode material includes $V_2O_z$ wherein z≦5 combined with $Ag_2O$ with silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and 5,516,340 to Takeuchi et al., both of which are assigned to the assignee of the present invention and incorporated herein by reference.

Other useful cathode active materials include manganese dioxide, copper vanadium oxide, titanium disulfide, copper oxide, copper sulfide, iron sulfide, iron disulfide, fluorinated carbon, and mixtures thereof. Preferred fluorinated carbon compounds are represented by the formula $(CF_x)_n$ wherein x varies between about 0.1 to 1.9 and preferably between about 0.5 and 1.2, and $(C_2F)_n$ wherein the n refers to the number of monomer units which can vary widely.

Before fabrication into an electrode for incorporation into an electrochemical cell, the cathode active material is preferably mixed with a binder material such as a powdered fluoropolymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium, stainless steel, and mixtures thereof. The preferred cathode active mixture thus includes a powdered fluoro-polymer binder present at a quantity of at least about 3 weight percent, a conductive diluent present at a quantity of at least about 3 weight percent and from about 80 to about 98 weight percent of the cathode active material.

Cathode components for incorporation into the cell may be prepared by rolling, spreading or pressing the cathode active mixture onto a suitable current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. For a silver vanadium oxide or copper silver vanadium oxide cathode, the current collector is preferably of aluminum or titanium with the latter being preferred.

A preferred method of cathode preparation is by contacting a blank cut from a free-standing sheet of cathode active material to a current collector. Blank preparation starts by taking granular silver vanadium oxide and adjusting its particle size to a useful range in an attrition or grinding step. In one preferred embodiment, the SVO is "high temperature" silver vanadium oxide (ht-SVO), prepared according to the methods described in U.S. Pat. No. 6,566,007 to Takeuchi et al. This patent is assigned to the assignee of the present invention and incorporated herein by reference. The preparation protocols of the '007 patent to Takeuchi et al. result in SVO having a surface area of from about 0.2 $m^2$/gram to about 0.8 $m^2$/gram. This material can be used as is or subsequently subjected to an attriting step to arrive at a desired surface area for cathode sheet preparation. If an attrited active material is desired, a ball mill or vertical ball mill is preferred and typical grinding time ranges from between about 10 to 15 minutes. Preferably, attriting results in an active material having a surface area up to about 2.6 $m^2$/gram.

In any event, the finely divided active material is then preferably mixed with carbon black and/or graphite as conductive diluents and a powder fluoro-resin such as polytetrafluoroethylene powder as a binder material to form a depolarizer admixture. This is typically done in a solvent of either water or an inert organic medium such as mineral spirits. The mixing process provides for fibrillation of the fluoro-resin to ensure material integrity. After mixing sufficiently to ensure homogeneity in the admixture, the active admixture is removed from the mixer as a paste.

Following the mixing step, the solvent is vacuum filtered from the paste to adjust the solvent content to about 0.25 cc to about 0.35 cc per gram of solids, i.e., the solids comprising the electrode active material (SVO), the conductive diluent and the binder. The resulting filter cake is fed into a series of roll mills that compact the active admixture into a thin sheet having a tape form, or the active filter cake is first run through a briquette mill. In the latter case, the active admixture is formed into small pellets which are then fed into the roll mills.

Typically, the compacting step is performed by roll mills comprising two to four calender mills that serve to press the admixture between rotating rollers to provide a free-standing sheet of the active material as a continuous tape. In a preferred method, cathodes are made from blanks prepared as described in U.S. Pat. No. 6,582,545 to Thiebolt III et al. This patent is assigned to the assignee of the present invention and incorporated herein by reference. It teaches that the basis weight of an electrode active admixture such as one including silver vanadium oxide is formed into an electrode structure from an admixture paste subjected to a calendering process using a secondary calendering step performed in a direction reverse or orthogonal to that used to form the initial sheet tape. Orthogonal or reverse feed of the electrode active admixture provides for fibrillation of the fluoro-polymeric binder in other than the initial direction. This lets the binder spread in directions transverse to the initial direction. In a broader sense, however, the secondary step is in any direction other than the first direction to provide the electrode active sheet tape having a second thickness less than the first thickness. It is believed that when the electrode active admixture is calendered in a single direction the binder is fibrillated to an extent near its maximum tensile strength. If the electrode active sheet tape is calendered in a secondary direction, the active admixture spreads in directions other than, and preferably transverse to, the initial direction. Accordingly, the secondary calendering step forms a sheet tape having a higher surface area and a lower basis weight, defined as grams/in$^2$ of the cathode active admixture, than the sheet material formed from the primary calendering. Preferably, the electrode active sheet tape comprises the active material having a basis weight of less than about 340 mg/in$^2$. The lower limit for the cathode basis weight is dictated by the fundamental requirement that the cell be capable of being pulse discharged to power an implantable medical device. As previously discussed, this means that the cell must be capable of delivering at least one pulse of electrical current of from about 15 mA/cm$^2$ to about 50 mA/cm$^2$ for sufficient period of time to deliver between about 20 and 85 joules.

The tape preferably has a thickness in the range of from about 0.004 inches to about 0.020 inches. The outer edges of the tape leaving the rollers are trimmed and the resulting tape is subsequently subjected to a drying step under vacuum conditions. The drying step serves to remove any residual solvent and/or water from the active material. Alternatively, the process can include the drop wise addition of a liquid electrolyte into the active mixture prior to the initial calendering step to enhance the performance and rate capacity of an assembled electrochemical cell. The active sheet tape can be stored for later use, or fed on a conveyor belt to a punching machine. The punching operation forms the sheet tape into active blanks of any dimension needed for preparation of an electrode component for use in a high energy density electrochemical cell. U.S. Pat. Nos. 5,435,874 and 5,571,640, both to Takeuchi et al., describe the preparation of a cathode component by an SVO sheeting process. These patents are assigned to the assignee of the present invention and incorporated herein by reference.

Alternate preparation techniques are shown in U.S. Pat. Nos. 4,830,940 and 4,964,877, both to Keister et al., which describe manufacturing a cathode by pressing a powdered admixture of SVO, conductive diluent and binder material onto a current collector. The above Keister et al. patents are assigned to the assignee of the present invention and incorporated herein by reference. Nonetheless, cathode blanks prepared as described above may be in the form of one or more plates operatively associated with at least one or more plates of anode material or, in the form of a strip wound with a corresponding strip of anode material in a structure similar to a "jellyroll".

In one embodiment, the cathode has one of the above active materials, for example SVO, contacted to both sides of the cathode current collector. In another embodiment, the cathode has a sandwich design as described in U.S. Pat. No. 6,551,747 to Gan. The sandwich cathode design comprises a first active material of a relatively high energy density but a relatively low rate capability in comparison to a second cathode active material. Fluorinated carbon is a preferred first cathode active material. One preferred second active material is silver vanadium oxide. Another is the previously described copper silver vanadium oxide.

One exemplary sandwich cathode electrode has the following configuration: SVO/current collector/$CF_x$/current collector/SVO.

Another exemplary sandwich cathode electrode configuration is: SVO/current collector/SVO/$CF_x$/SVO/current collector/SVO.

Still another configuration for an electrochemical cell with a sandwich electrode has a lithium anode and a cathode configuration of: SVO/current collector/$CF_x$, with the SVO facing the lithium anode.

In a broader sense, it is contemplated by the scope of the present invention that the second active material of the sandwich cathode design is any material which has a relatively lower energy density but a relatively higher rate capability than the first active material. In that respect, other than silver vanadium oxide and copper silver vanadium oxide, $V_2O_5$, $MnO_2$, $LiCoO_2$, $LiNiO_2$, $LiMn_2O_4$, $TiS_2$, CuS, FeS, $FeS_2$, CuO, copper vanadium oxide (CVO), and mixtures thereof are useful as the second active material. And, in addition to fluorinated carbon, $Ag_2O$, $Ag_2O_2$, CuF, $Ag_2CrO_4$, $MnO_2$, and even SVO itself, are useful as the second active material. The theoretical volumetric capacity (Ah/ml) of $CF_x$ is 2.42, $Ag_2O_2$ is 3.24, $Ag_2O$ is 1.65 and $AgV_2O_{5.5}$ is 1.37. Thus, $CF_x$, $Ag_2O_2$, $Ag_2O$, all have higher theoretical volumetric capacities than that of SVO.

In order to prevent internal short circuit conditions, the cathode is physically segregated from the lithium anode by a separator. The separator is of electrically insulative material that is chemically unreactive with the anode and cathode active materials and both chemically unreactive with and insoluble in the electrolyte. In addition, the separator material has a degree of porosity sufficient to allow flow there through of the electrolyte during the electrochemical reactions of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX® (Chemplast Inc.), a polypropylene membrane commercially available under the designation CELGARD® (Celanese Plastic Company, Inc.), a membrane commercially available under the designation DEXIGLAS® (C.H. Dexter, Div., Dexter Corp.), and a membrane commercially available under the designation TONEN®.

The electrochemical cell of the present invention further includes a nonaqueous, ionically conductive electrolyte serving as a medium for migration of ions between the anode and the cathode electrodes during electrochemical reactions of the cell. The electrochemical reaction at the electrodes involves conversion of ions in atomic or molecular forms that migrate from the anode to the cathode. Thus, suitable nonaqueous electrolytes are substantially inert to the anode and cathode materials, and they exhibit those physical properties necessary for ionic transport, namely, low viscosity, low surface tension and wettability.

A suitable electrolyte has an inorganic, ionically conductive lithium salt dissolved in a mixture of aprotic organic solvents comprising a low viscosity solvent and a high permittivity solvent. Preferred lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6FSO_3$, $LiO_2CCF_3$, $LiSO_6F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof. In the present invention, the preferred electrolyte for a Li/SVO cell is 0.8M to 1.5M $LiAsF_6$ or $LiPF_6$ dissolved in a 50:50 mixture, by volume, of propylene carbonate and 1,2-dimethoxyethane.

The preferred form of the electrochemical cell is a case-negative design wherein the anode/cathode couple is inserted into a conductive metal casing connected to the anode current collector, as is well known to those skilled in the art. A preferred material for the casing is stainless steel, although titanium, mild steel, nickel, nickel-plated mild steel and aluminum are also suitable. The casing header comprises a metallic lid having a sufficient number of openings to accommodate the glass-to-metal seal/terminal pin feedthrough for the cathode. The anode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present invention can also be constructed in a case-positive design.

Figure 3:
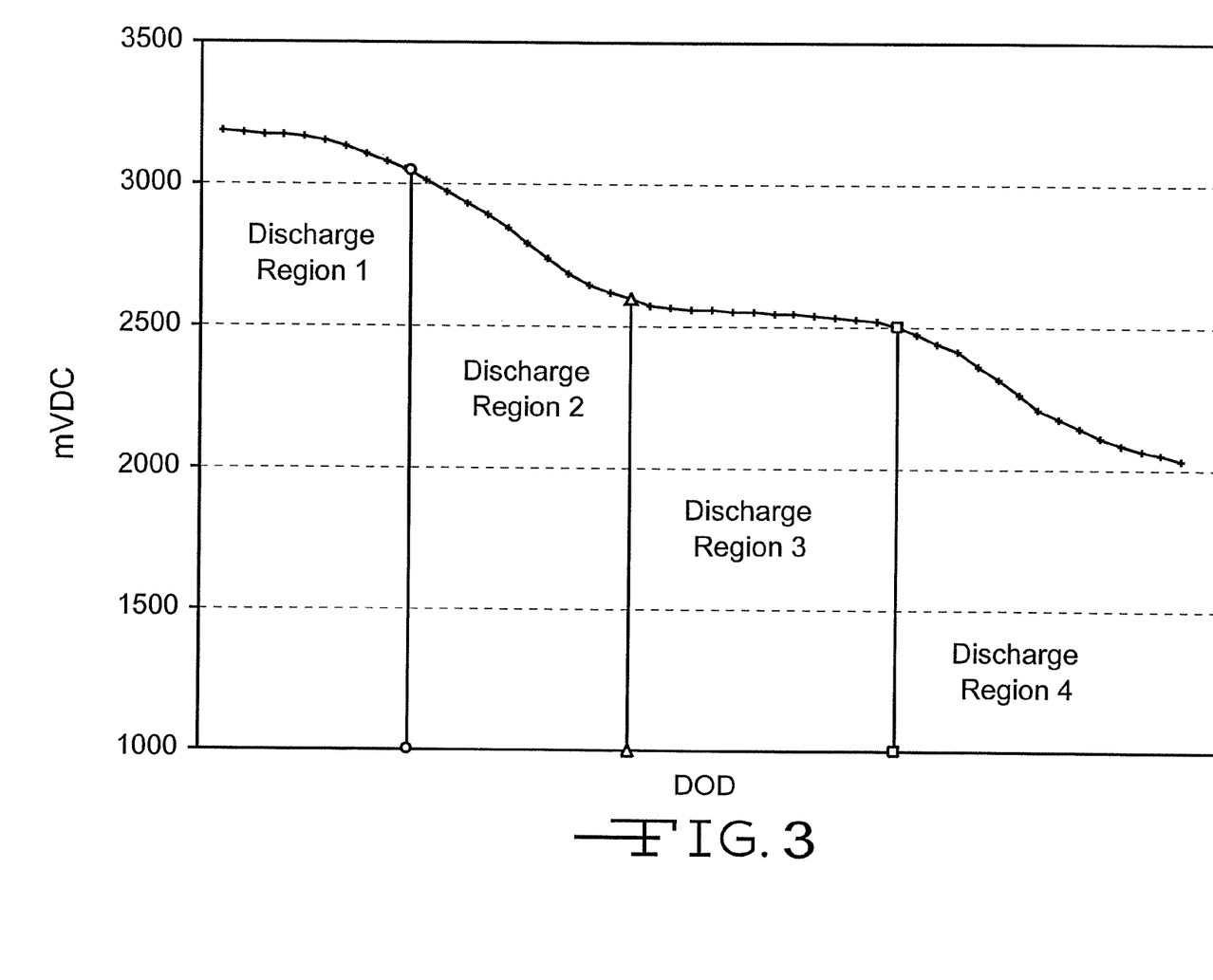
FIG. 3 is a graph illustrating the discharge profile of a typical Li/SVO cell.

As shown in FIG. 3, the background discharge profile of a typical Li/SVO cell consists of four regions: regions 1 and 3 are referred to as the plateau regions while regions 2 and 4 are transition regions. Lithium/silver vanadium oxide cells generally have stable internal resistance (Rdc) in regions 1 and 2. When cathodes are prepared from an SVO powder process as described in the previously referenced Keister et al. patents, the initiation point of irreversible Rdc growth and voltage delay is typically found at the beginning of region 3, or around a background voltage of about 2.6V. However, when SVO cathodes are prepared using the sheet process of the previously referenced Takeuchi et al. patents, initiation of irreversible Rdc growth and voltage delay are typically found in the middle of region 2, or at a background voltage in the range of about 2.8V to 2.9V. This means that even though irreversible Rdc growth and voltage delay are a function of cathode processing, they are not typically observed until the latter parts of region 2 to the beginning of region 3. This correlates to about 25% to 40% DoD.

Voltage delay and Rdc growth are impacted by cell design parameters including electrode geometry and selection of active materials. Without wishing to be bound to any particular theory, it is believed that voltage delay in lithium/solid cathode cells, for example Li/SVO cells, is caused when a film forms on the anode, causing the initial pulse voltage to drop substantially. It is thought that this film forms as a result of vanadium dissolution from the silver vanadium cathode active material, which is then reductively deposited on the anode surface. The vanadium forms a passivating film which increases Rdc.

From extensive accelerated discharge studies with Li/SVO cells, it has been discovered that by limiting the amount of cathode active material per unit area (i.e. the basis weight) facing the anode, the magnitude of growth of the solid-electrolyte interphase (SEI) passivating film can be limited. Alternately, to the extent that a passivating film does grow, it has a structure that allows for sufficient lithium ion migration there through so that Rdc and voltage delay are limited to acceptable levels and overall discharge performance is not significantly degraded.

A cardiac defibrillator essentially consists of an electrochemical cell as a power source for charging at least one electrolytic capacitor to deliver an electrical shock therapy to the patient's heart. Microprocessors powered by the cell perform heart sensing and pacing. These functions require electrical current of about 1 microampere to about 100 milliamperes. From time-to-time, the cardiac defibrillator may require a generally high rate, pulse discharge load component that occurs, for example, during charging of a capacitor in the defibrillator for the purpose of delivering an electrical shock therapy to the heart to treat a tachyarrhythmia, the irregular, rapid heartbeats that can be fatal if left uncorrected. This requires electrical current of about 1 ampere to about 4 amperes.

In automatic implantable cardiac defibrillator applications, one very important parameter is the charge time to achieve a predetermined energy for therapy delivery. In other words, the time to charge a capacitor to a required voltage is affected by Rdc growth and voltage delay. A typical automatic implantable cardiac defibrillator requires energy in the range of from about 20 Joules to about 90 Joules per Li/SVO cell for electrical shock therapy. The relationship is shown below:

$$\text{Energy}(J) = I(\text{amp}) \times V(\text{volt}) \times t(\text{sec.})$$

Therefore, $t(s) = \text{energy}(J)/I \times V$.

If the required delivered energy (J) and pulsing current (amp) are both defined, then the charge time in seconds is inversely proportional to the average voltage under pulsing. To maintain a relatively low charge time, the cell must deliver higher voltage under pulsing. This requirement is, however, compromised by the previously discussed irreversible Rdc growth and voltage delay phenomena in the Li/SVO system possibly beginning at the middle of discharge life region 2 (starting at about 25% DoD). Under severe conditions, cell voltage under pulsing becomes so low that the charge time is considered too long for the required therapy. Since irreversible Rdc growth and voltage delay start at about 25% to 40% DoD, it is possible that only about 25% of the theoretical capacity of a particular Li/SVO cell (region 1 and a portion of region 2) may actually be delivered. The remaining capacity (regions 3 and 4) is wasted, which translates into a shorter device service life.

Not only do Li/SVO cells experience irreversible Rdc growth and voltage delay problems beginning at about 25% DoD, but electrolytic capacitors can experience degradation in their charging efficiency after long periods of inactivity. It is believed that the anodes of electrolytic capacitors, which are typically of aluminum or tantalum, develop micro-fractures in their dielectric oxides after extended periods of non-use. These micro-fractures consequently result in extended charge times and reduced breakdown voltages. Degraded charging efficiency ultimately requires that a Li/SVO cell progressively expend more and more energy to charge the capacitors for providing therapy.

To repair this degradation, microprocessors controlling the automatic implantable cardiac defibrillator are programmed to regularly charge the electrolytic capacitors to or near a maximum-energy breakdown voltage (the voltage corresponding to maximum energy) before discharging them internally through a non-therapeutic load. The capacitors can be immediately discharged once the maximum-energy voltage is reached or they can be held at maximum-energy voltage for a period of time, which can be rather short, before being discharged. These periodic charge-discharge or charge-hold-discharge cycles for capacitor maintenance are called "reforms." Reforming automatic cardiac implantable defibrillator capacitors at least partially restores and preserves their charging efficiency.

An industry-recognized standard is to reform implantable capacitors by pulse discharging the connected electrochemical cell about once every 90 to 180 days throughout the useful life of the medical device, which is typically dictated by the life of the cell. However, during the irreversible Rdc growth and voltage delay region at about 25% to 70% DoD, it is desirable to pulse discharge the Li/SVO cell at a more frequent rate, as taught by the previously discussed U.S. Pat. Nos. 6,930,468 to Syracuse et al., 6,982,543 to Syracuse et al. and 7,026,791 to Palazzo et al. The reason for this more frequent pulse discharging is to break up the passivation layer forming at the SEI at the anode so that when the medical device is required to charge the capacitors during device activation mode, the charge time is relatively low. The consequence is that more useful energy is expended for non-therapeutic applications by these more frequent pulse discharges, even more than is needed for capacitor reform.

Thus, the basis for the present invention is driven by the desire to substantially reduce, if not completely eliminate, irreversible Rdc growth and voltage delay in a Li/SVO cell while at the same time maintaining sufficient discharge capacity to periodically reform the connected capacitors to maintain them at their rated breakdown voltages. That is without using one of the previously described energy-consuming cell reforming methodologies described in Syracuse et al. '468 and '543 patents and the Palazzo et al. '791 patent Instead, in the present invention, the reduction in irreversible Rdc growth and voltage delay is accomplished by providing the cathode having a relatively low basis weight. This means that the cell is usable well into its DoD range without the need for subjecting the cell to comparatively more energy-consuming cell reforming pulse sequences in lieu of the more conservative capacitor reforming pulse sequences. In spite of there being less total cathode active material available for energy conversion, the useful life of a low-basis weight cathode cell is extended beyond that of a higher basis weight cathode cell.

Accordingly, the following examples describe the manner and process of an electrochemical cell according to the present invention, and they set forth the best mode contemplated by the inventors of carrying out the invention, but they are not to be construed as limiting.

Example I

A set of Li/SVO cells were built with different ht-SVO cathode basis weights as shown in Table 1. Each group included four identical cells. For cells having cathodes of a relatively lower basis weight and, therefore, lower electrode active material thicknesses, inert spacers were used on the outside of the electrode assembly to normalize the cell stack pressure.

TABLE 1

Figure 4:
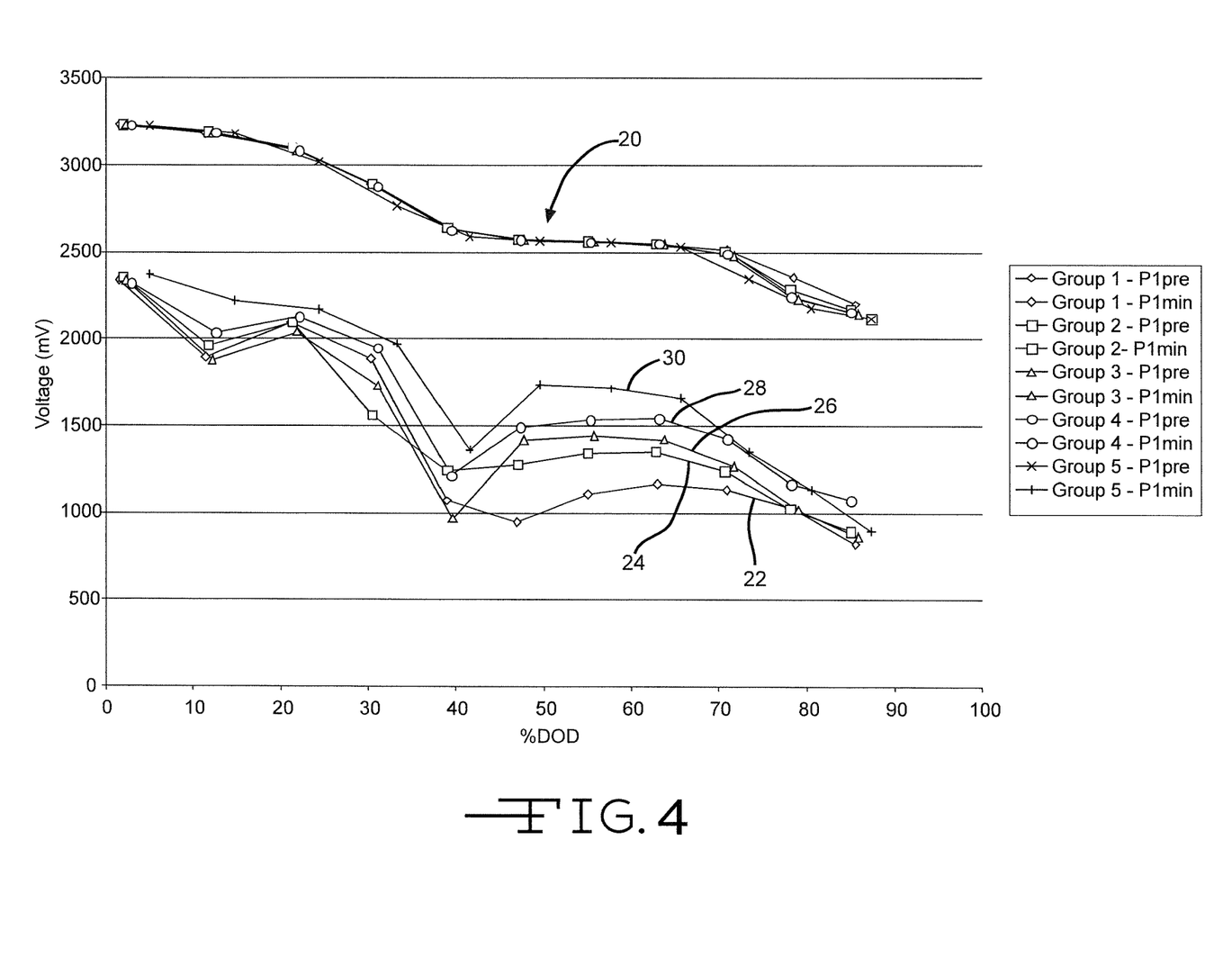
FIG. 4 is a graph constructed from the average background voltages and minimum pulse voltages of five groups of Li/SVO cells pulsed every 150 days and having a range of cathode active material basis weights.
Figure 5:
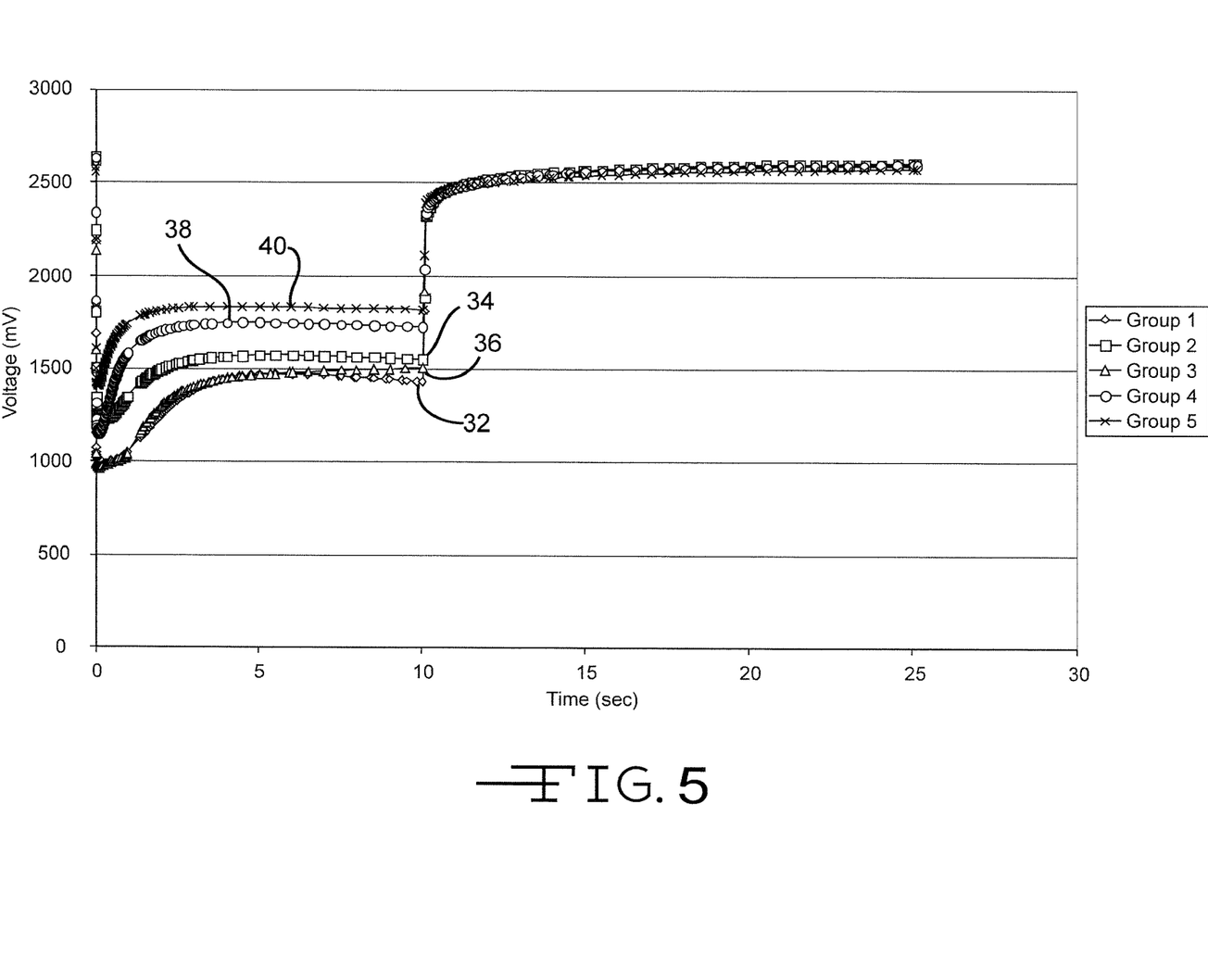
FIG. 5 is a graph illustrating the average waveforms of the 10-second current pulses taken at about 40% DoD for the groups of cells shown in FIG. 4.
Figure 6:
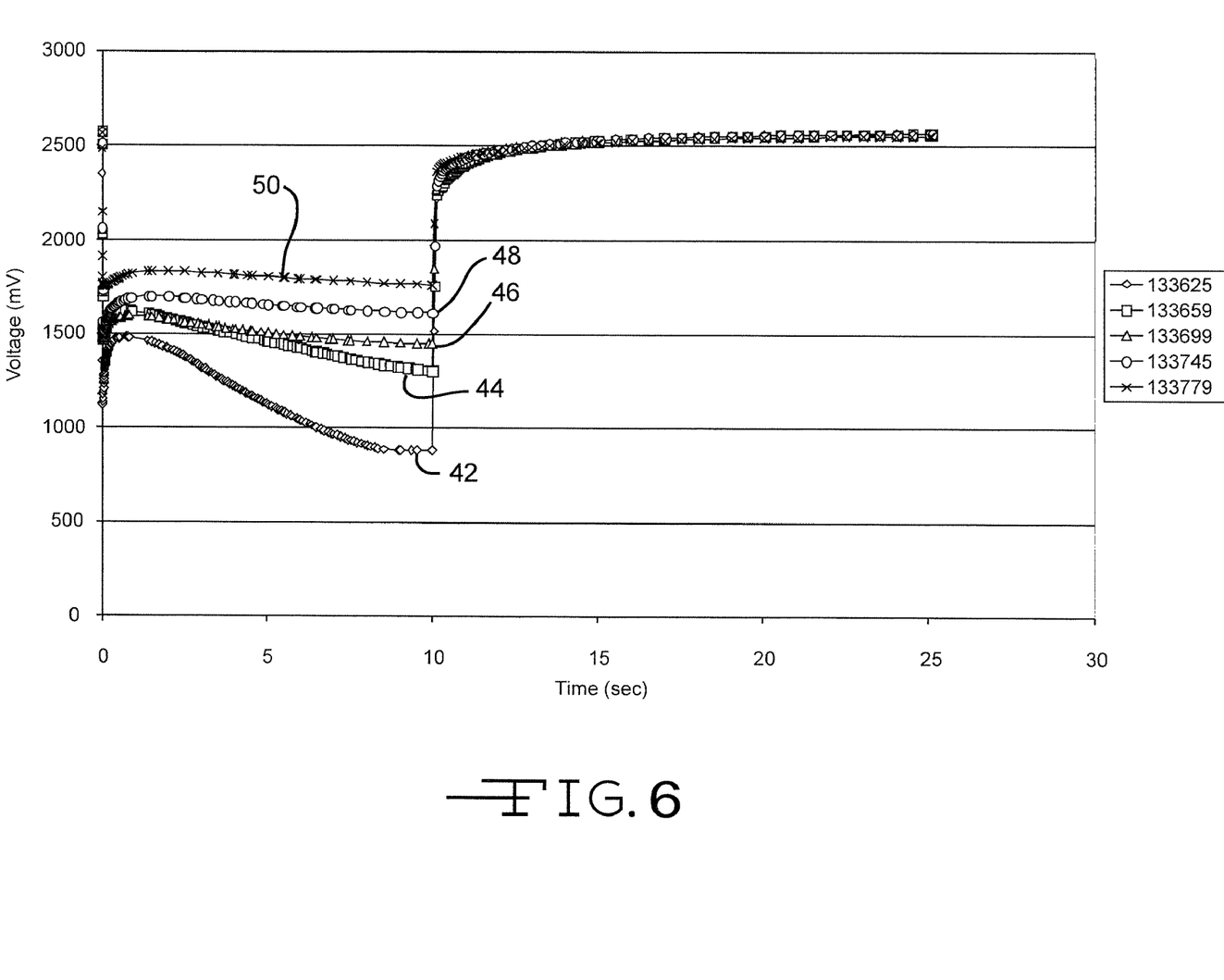
FIG. 6 is a graph illustrating the average waveforms of the 10-second current pulses taken at about 50% DoD for the groups of cells shown in FIG. 4.
Figure 7:
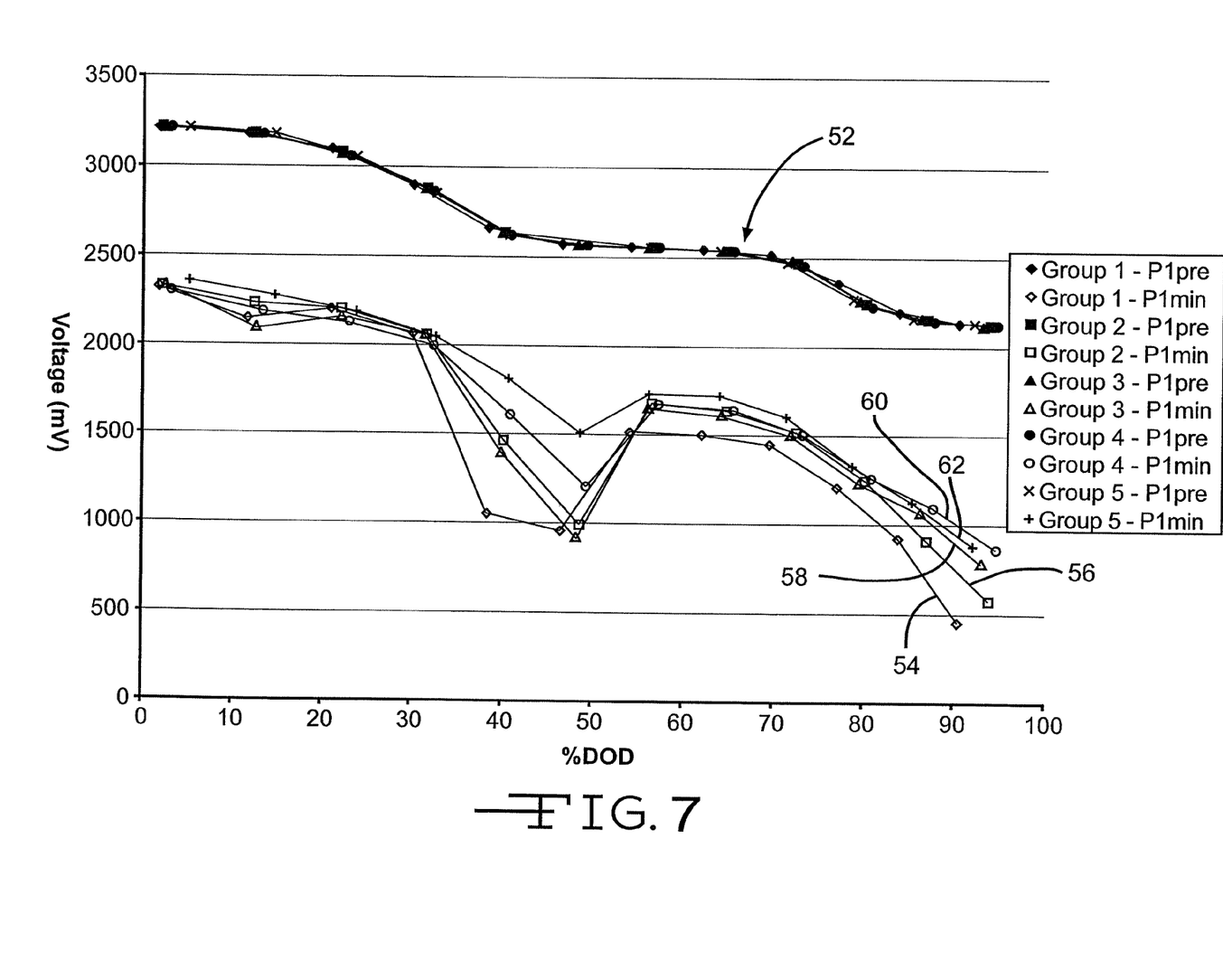
FIG. 7 is a graph constructed from the average background voltages and minimum pulse voltages of five groups of Li/SVO cells pulsed every 24 days and having a range of cathode active material basis weights.

| Group | Basis Weight (mg/in$^2$) | Related Reference Numerals In: | | | |
|---|---|---|---|---|---|
| | | FIG. 4 | FIG. 5 | FIG. 6 | FIG. 7 |
| 1 | 704 | 22 | 32 | 42 | 54 |
| 2 | 575 | 24 | 34 | 44 | 56 |
| 3 | 479 | 26 | 36 | 46 | 58 |
| 4 | 370 | 28 | 38 | 48 | 60 |
| 5 | 214 | 30 | 40 | 50 | 62 |

Each cell was discharged at 37° C. under a constant load for 60 months to 100% DoD except for the data in FIG. 4, which ends at 85% DoD. The specific load used was dependent upon the cathode basis weight. The cells were also subjected to a single 10-second, 3.15 amp pulse every 150 days administered at 37° C., resulting in a current density of 35 mA/cm$^2$.

FIG. 4 shows the average background voltages 20 and the average minimum pulse (P$_{min}$) voltages 22, 24, 26, 28 and 30 for each of the five basis weight groups of Table 1. The average background voltages 20 exhibited the typical discharge regions as described previously and shown in FIG. 3. The average P$_{min}$ voltages for the five groups exhibited Rdc growth in the range of about 30% DoD to about 40% DoD, with a minimum value of P$_{min}$ occurring in region 2 at about 40% to 45% DoD.

What is noteworthy is that for the lowest basis weight cells represented by data set 30, the average Rdc growth is reversible, while for the highest basis weight cells represented by data set 22, the average Rdc growth is irreversible. The average P$_{min}$ voltage 30 for the lowest basis weight cells recovered from their trough at about 35% to 45% DoD, and then followed a trajectory that was comparable to the background voltage curve 20. The average P$_{min}$ voltage 22 for the highest basis weight cells showed virtually no recovery, in spite of the continued pulsing that was administered for the purpose of capacitor reforming. The average P$_{min}$ voltages 24, 26 and 28 of the intermediate basis weight cells showed varying degrees of reversal of Rdc growth, with the trend clearly being that cells of lower basis weights showed greater degrees of recovery.

FIG. 5 is a graph illustrating the average waveforms of the 10-second current pulses taken at about 40% DoD (i.e., pulse train 5) for the groups of cells shown in FIG. 4. The data of FIG. 5 support the conclusions drawn from FIG. 2. The average waveform 40 for the lowest basis weight cells had the lowest Rdc growth and thus the highest pulse voltage. This group also exhibited significantly less voltage delay than the other cells investigated. In contrast, the average waveform 32 for the highest basis weight cells had the highest Rdc growth and thus the lowest pulse voltage. This group of cells exhibited the maximum voltage delay and had a very unstable pulse voltage with significant voltage delay during the pulse. In the region of maximum Rdc growth at about 40% DoD, the cells of lowest basis weight exhibited the best discharge performance.

Further, FIG. 6 is a graph illustrating the average waveforms of the 10-second current pulses taken at about 50% DoD (i.e., pulse train 6) for the groups of cells shown in FIG. 4. The data of FIG. 6 support the conclusions drawn from FIG. 2. The average waveforms for the highest basis weight cells demonstrated that increased voltage delay leads to higher Rdc growth in subsequent pulse trains while the lower basis weight materials showed far superior P$_{min}$ pulsing performance relative to the high basis weight materials.

Example II

A set of Li/SVO cells were built with different ht-SVO cathode basis weights as shown in Table 1. Each group included three identical cells. For cells having cathodes of a relatively lower basis weight and, therefore, lower electrode active material thicknesses, inert spacers were used on the outside of the electrode assembly to normalize the cell stack pressure.

Each cell was discharged at 50° C. under a constant load for 10 months to 100% depth of discharge. The specific load used was dependent upon the cathode basis weight. The cells were also subjected to a single 10-second, 3.15 A pulse every 24 days, instead of 150 days as in FIG. 4, administered at 37° C. and resulting in a current density of 35 mA/cm$^2$.

The results obtained using these higher pulse frequency discharge regimes were similar to those shown in FIGS. 4 to 6. In particular, the average P$_{min}$ voltage for the highest basis weight cells 54 showed less recovery in their trough at about 35% to 45% DoD in spite of the continued pulsing that was administered for the purpose of capacitor reforming. The average P$_{min}$ voltages 56 and 58 of the intermediate basis weight cells showed varying degrees of reversal of Rdc growth, with the trend clearly being that cells of lower basis weights 60 and 62 showed the greater degree of recovery.

The conclusion is that the higher P$_{min}$ voltage of the lower basis weight cells and their stable voltage profile after Rdc recovery enables reliable use of such cells in an implantable device from 50% to about 70% DoD. Since it has less total cathode active material available for energy conversion, it might be expected that in a lower basis weight cell, the useful life of such a cell would be reduced. However, a relatively lower basis weight cell according to the present invention has an unexpectedly longer life compared to a relatively higher basis weight cell. This is because a lower basis weight cell can be reliably used to a much higher DoD. From the data of FIGS. 4 to 7, and from other experimental data, an optimum upper limit for the SVO cathode basis weight which provides good cell capacity and minimal voltage delay and Rdc growth is about 340 mg/in$^2$.

While this invention has been described in conjunction with preferred embodiments thereof, it is evident that many alternatives, modifications, and variations will be apparent to those skilled in the art. Accordingly, it is intended to embrace all such alternatives, modifications and variations that fall within the broad scope of the appended claims.

What is claimed is:

1. An electrochemical cell, which comprises:
   a) an alkali metal anode;
   b) a cathode including a first portion facing the anode and comprising a cathode active material having a basis weight in a range from about 214 mg/in$^2$ to about 340 mg/in$^2$ such that the cell is dischargeable to deliver at least one pulse of electrical current of from about 15 mA/cm² to about 50 mA/cm² for a sufficient period of time to deliver from about 20 to 85 joules; and c) an electrolyte activating the anode and the cathode.

2. The electrochemical cell of claim 1 wherein the anode is comprised lithium and the cathode active material is selected from the group consisting of silver vanadium oxide, copper silver vanadium oxide, manganese dioxide, copper vanadium oxide, titanium disulfide, copper oxide, copper sulfide, iron sulfide, iron disulfide, fluorinated carbon, and mixtures thereof.

3. The electrochemical cell of claim 1 wherein the cathode comprises from between about 80 weight percent to about 99 weight percent of the cathode active material.

4. The electrochemical cell of claim 1 wherein the cathode further comprises a conductive additive.

5. The electrochemical cell of claim 1 wherein the cathode further comprises a fluoro-polymer binder material selected from powdered polytetrafluoroethylene and powdered polyvinylidene fluoride present at about 1 to about 5 weight percent of the cathode mixture.

6. The electrochemical cell of claim 1 wherein the cathode is comprised of a current collector selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys.

7. The electrochemical cell of claim 1 wherein the electrolyte has a first solvent selected from an ester, a linear ether, a cyclic ether, a dialkyl carbonate, and mixtures thereof, and a second solvent selected from a cyclic carbonate, a cyclic ester, a cyclic amide, and mixtures thereof.

8. The electrochemical cell of claim 1 wherein the first solvent is selected from the group consisting of tetrahydrofuran, methyl acetate, diglyme, triglyme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof, and the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

9. The electrochemical cell of claim 1 wherein the electrolyte includes a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)$, LiSCN, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

10. The electrochemical cell of claim 1 wherein the electrolyte is 0.8M to 1.5M $LiAsF_6$ or $LiPF_6$ dissolved in a 50:50 mixture, by volume, of propylene carbonate and 1,2-dimethoxyethane.

11. The electrochemical cell of claim 1 wherein the cathode has a configuration selected from: SVO/current collector/$CF_x$/current collector/SVO, SVO/current collector/SVO/$CF_x$/SVO/current collector/SVO, and SVO/current collector/$CF_x$, with the SVO facing the lithium anode.

12. An electrochemical cell, which comprises:
a) a lithium anode;
b) a cathode having a configuration selected from:
silver vanadium oxide (SVO)/current collector/$CF_x$/current collector/SVO, SVO/current collector/SVO/$CF_x$/SVO/current collector/SVO, and SVO/current collector/$CF_x$, with the SVO facing the lithium anode, wherein at least that portion of the cathode comprising the SVO has a basis weight in a range from about 214 mg/in² to about 340 mg/in² such that the cell is dischargeable to deliver at least one pulse of electrical current of from about 15 MA/cm² to about 50 mA/cm² for a sufficient period of time to deliver from about 20 to 85 joules; and
c) an electrolyte activating the anode and the cathode.

13. A method of powering an implantable medical device with an electrochemical cell, the cell comprising an alkali metal anode coupled to a cathode of a cathode active material activated with an electrolyte, comprising the steps of:
a) providing the anode;
b) providing the cathode of a cathode active material having a basis weight in a range from about 214 mg/in² to about 340 mg/in² such that the cell is dischargeable to deliver at least one pulse of electrical current of from about 15 mA/cm² to about 50 mA/cm² for a sufficient period of time to deliver from about 20 to 85 joules;
c) positioning the anode and the cathode inside a casing with an intermediate separator prevent direct physical contact between them;
d) activating the anode and the cathode with an electrolyte;
e) connecting a negative terminal and a positive terminal of the cell to the implantable medical device;
f) powering the implantable medical device with the cell; and
g) subjecting the cell to a reform protocol of discharging the cell to deliver repeated pulses of electrical current of significantly greater amplitude than that of a pre-pulse current or open circuit voltage immediately prior to the first pulse discharge of the repeated pulses.

14. The method of claim 13 including providing the anode comprising lithium and selecting the cathode active material from the group consisting of silver vanadium oxide, copper silver vanadium oxide, manganese dioxide, copper vanadium oxide, titanium disulfide, copper oxide, copper sulfide, iron sulfide, iron disulfide, fluorinated carbon, and mixtures thereof.

15. The method of claim 13 wherein the cathode has a configuration selected from: SVO/current collector/$CF_x$/current collector/SVO, SVO/current collector/SVO/$CF_x$/SVO/current collector/SVO, and SVO/current collector/$CF_x$, with the SVO facing the lithium anode.

16. The method of claim 13 including pulsing the cell at least about every 90 days.

* * * * *

UNITED STATES PATENT AND TRADEMARK OFFICE
CERTIFICATE OF CORRECTION

| | | |
|---|---|---|
| PATENT NO. | : 7,939,199 B1 | Page 1 of 1 |
| APPLICATION NO. | : 11/736039 | |
| DATED | : May 10, 2011 | |
| INVENTOR(S) | : Gan et al. | |

It is certified that error appears in the above-identified patent and that said Letters Patent is hereby corrected as shown below:

IN THE CLAIMS:

Column 13, claim 9, line 48: LiN(SO2CF3) should be LiN(SO2CF3)2

Column 14, claim 12, line 14: MA/cm2 should be mA/cm2

Signed and Sealed this
Twenty-first Day of June, 2011

David J. Kappos
*Director of the United States Patent and Trademark Office*